(12) United States Patent
Barr

(10) Patent No.: US 11,519,708 B2
(45) Date of Patent: Dec. 6, 2022

(54) TOOL FOR VERIFYING THE LEVELING OF VINYL SIDING AT CORNER LOCATIONS

(71) Applicant: Ralph S Barr, Springfield, IL (US)

(72) Inventor: Ralph S Barr, Springfield, IL (US)

( * ) Notice: Subject to any disclaimer, the term of this patent is extended or adjusted under 35 U.S.C. 154(b) by 0 days.

(21) Appl. No.: 17/378,995

(22) Filed: Jul. 19, 2021

(65) Prior Publication Data
US 2022/0018645 A1    Jan. 20, 2022

Related U.S. Application Data

(60) Provisional application No. 63/053,244, filed on Jul. 17, 2020.

(51) Int. Cl.
*G01C 9/34* (2006.01)
*G01B 5/25* (2006.01)
*E04F 21/18* (2006.01)

(52) U.S. Cl.
CPC ............ *G01B 5/25* (2013.01); *E04F 21/1877* (2013.01); *G01C 9/34* (2013.01)

(58) Field of Classification Search
CPC .............. G01B 5/25; G01C 9/28; G01C 9/34
USPC .................................................. 33/379–390
See application file for complete search history.

(56) References Cited

U.S. PATENT DOCUMENTS

| 3,524,259 | A | * | 8/1970 | Handley | ............... | G01C 9/34 |
| | | | | | | 33/340 |
| 5,524,353 | A | | 6/1996 | Fink | | |
| 5,594,669 | A | * | 1/1997 | Heger | ............... | G01C 9/06 |
| | | | | | | 33/366.11 |
| 5,720,114 | A | | 2/1998 | Guerin | | |
| 6,029,359 | A | * | 2/2000 | Szumer | ............... | G01C 9/28 |
| | | | | | | 33/465 |
| 6,705,021 | B2 | | 3/2004 | Nadal et al. | | |
| 6,834,435 | B2 | * | 12/2004 | Turner | ............... | G01C 9/28 |
| | | | | | | 33/529 |
| 7,882,643 | B1 | * | 2/2011 | Portinen | ............... | G01B 3/04 |
| | | | | | | 33/474 |
| 8,732,972 | B2 | * | 5/2014 | Jordan | ............... | E04G 21/1891 |
| | | | | | | 33/613 |
| 9,151,606 | B2 | * | 10/2015 | Silberberg | ............... | G01C 9/28 |
| 2017/0160067 | A1 | | 6/2017 | Gallo | | |

* cited by examiner

*Primary Examiner* — George B Bennett
(74) *Attorney, Agent, or Firm* — Sandberg Phoenix & von Gontard PC

(57) ABSTRACT

A vinyl siding alignment tool for verifying the alignment of vinyl siding panels around the exterior of a building. The tool is configured to verify the alignment of the panels around a corner post regardless of whether it is an acute or obtuse angle. The tool is fitted with a leveling means for providing immediate feedback to the installer. The tool further comprises a handle and a support means for providing a balanced weight about the center of gravity, making the tool easy to use with very little effort. The tool is versatile in that it allows the user to verify alignment about an interior angle using two distinct methods.

9 Claims, 3 Drawing Sheets

TOOL FOR VERIFYING THE LEVELING OF VINYL SIDING AT CORNER LOCATIONS

CROSS-REFERENCE TO RELATED APPLICATIONS

This application claims the benefit of U.S. Provisional application 63/053,244, filed Jul. 17, 2020, which is hereby incorporated by reference.

STATEMENT REGARDING FEDERALLY SPONSORED RESEARCH OR DEVELOPMENT

Not Applicable.

BACKGROUND

This application relates to a tool used to verify the alignment of the installed vinyl siding about a corner post of a building, such as a residential house.

Vinyl siding is a type of siding used on the exterior of a building, such as a family residence. During construction, vinyl siding is installed on the exterior for its relatively inexpensive cost, practicality, and visually appealing nature. Proper alignment around corners is needed. Otherwise, the visual appeal will suffer.

As shown in FIG. 1, a typical panel of vinyl siding includes a nail flange, a lock, a center butt, a bottom butt, and a butt leg. For proper installation of vinyl siding, installers use the following process. First, a starter strip is set in place, with special attention to the strip being at the same elevation all around the structure. Next, the corner posts are generally set by measuring out from the corner the desired distance at the top and bottom. Using these points, a chalk line may be snapped. The corner post is aligned to the chalk line and nailed in place at the nail flange. An installer will then start at the starter strip and works up the wall, panel by panel. Each panel is installed by sliding the butt leg of the upper panel into the lock of the lower panel. When the upper panel is properly placed, it may be nailed at the nail flange to secure it in place. This process will continue until all sections of vinyl siding are completed. If each panel of siding is installed correctly, the panels on both sides of a corner post will be in alignment. However, during the installation process, strips of vinyl that are installed around corners may fall out of alignment for various reasons.

In general, the alignment verifications step is covered by a conventional means using a series of tape measurements from horizontal chalk lines, the top of a structure, or the siding starter strip. Misalignments may be caused, e.g., by structural changes such as in porches, steps, or corners. Adjustment is conventionally done with a level and tape measure and must be undertaken for each panel around a corner post. This can be a lengthy and time-consuming process. Therefore, a faster, simple, and reliable method is needed to verify that vinyl siding panels are installed and stay in alignment around corner posts during installation.

BRIEF SUMMARY

Enclosed in this application is a tool that verifies the leveling of the vinyl siding of a building across both inner and outer corners. The tool includes a main frame with a pair of adjacent sides at a generally perpendicular angle. It includes a cutout region at one corner with interior notches for fitting around exterior corners for verifying the leveling across the corners. The adjacent sides include abutment surfaces that abut the vinyl sides for verifying the leveling of the pieces around the corner. The adjacent sides are positioned such that they may provide dual use of being used for both interior and exterior corners. The tool is further defined with a second cutout region on an opposite corner from the first corner for verifying the leveling of the vinyl siding on an interior corner. Thus, the tool has multiple methods of leveling across an interior corner. Lastly, the tool includes a handle and a fluid level for providing immediate feedback to the user when installing vinyl siding.

In carrying out an embodiment of the method of the disclosure, place the tool on the appropriate inside or outside corner. Position the tool so it is just below and in contact with the middle butt or butt of the 2 siding panels. The tool should be substantially perpendicular to both walls. If the bubble in the level is centered, the panels are aligned. If bubble level is not centered, slide one panel contact down until the bubble is centered. The distance between the center butt or butt of the panel and the tool will indicate how much the panels are out of alignment. If the siding installer suspects that the siding is not aligned across an outside or inside corner post, use the procedure outlined herein.

Sometimes when installing siding, you can come across a point that requires a height adjustment in the panel to maintain panel alignment. This generally involves porches and steps and can involve an outside or inside corner post. The tool can be used to set the height adjustment by placing the tool below and touching either the middle or butt of the installed panel. Level the tool and place a mark on the side without the siding panel and measure the distance from the mark to the obstruction in question. This will give a measurement of how much material is to be removed from the appropriate section of the panel. Remove the material and Install the panel. The siding alignment is maintained.

BRIEF DESCRIPTION OF THE DRAWINGS

Corresponding reference numerals will be used throughout the several figures of the drawings.

DETAILED DESCRIPTION

Figure 1:
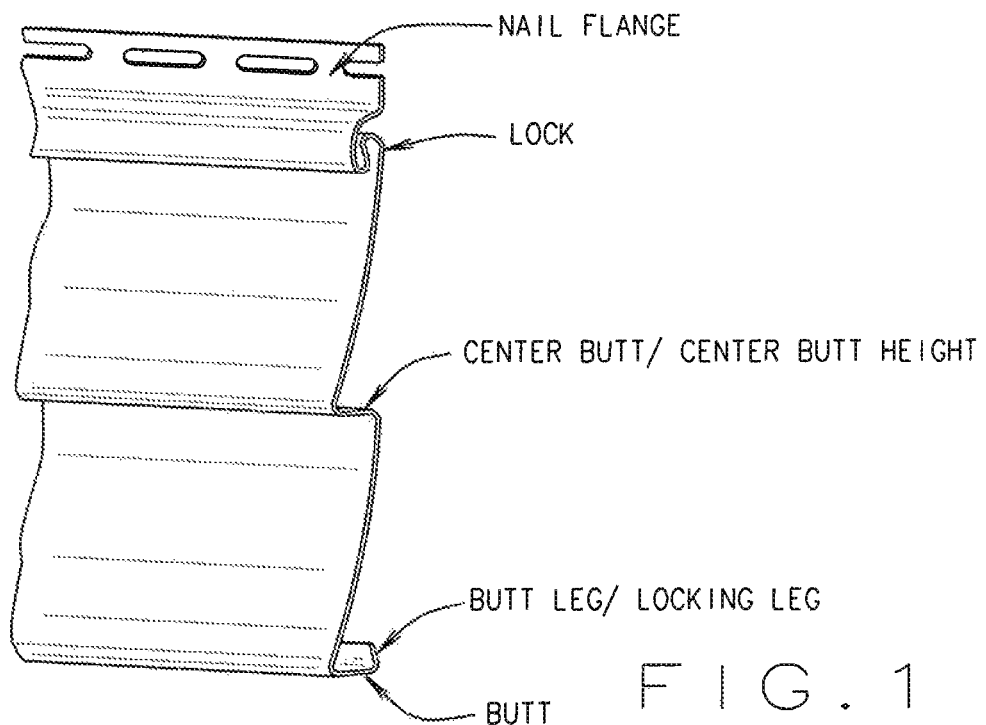
FIG. 1 is a perspective view of a vinyl siding panel.

The following detailed description illustrates the claimed invention by way of example and not by way of limitation. This description will clearly enable one skilled in the art to make and use the claimed invention and describes several adaptations and uses of the claimed invention, including what I presently believe is the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

Figure 2A:
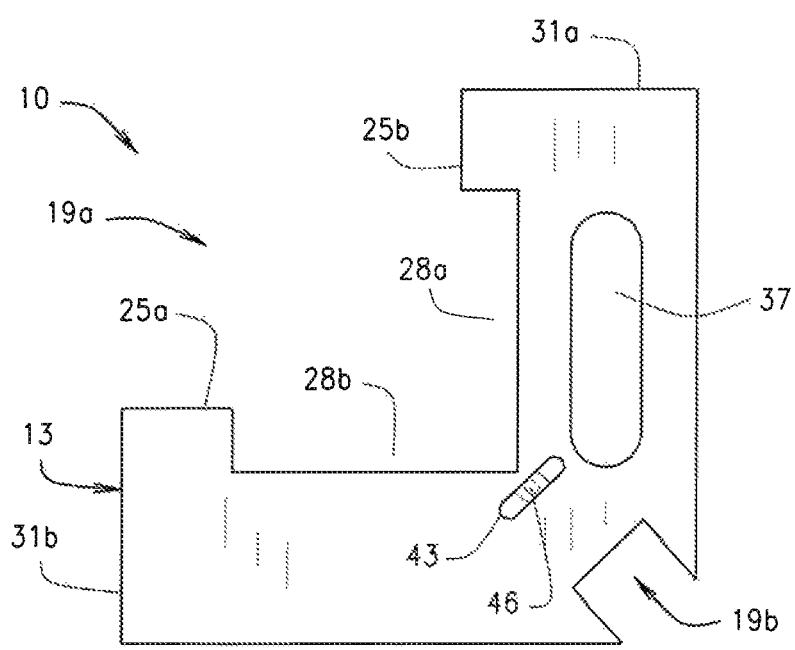
FIGS. 2a and 2b are top plan views of the siding installation tool.
Figure 2B:
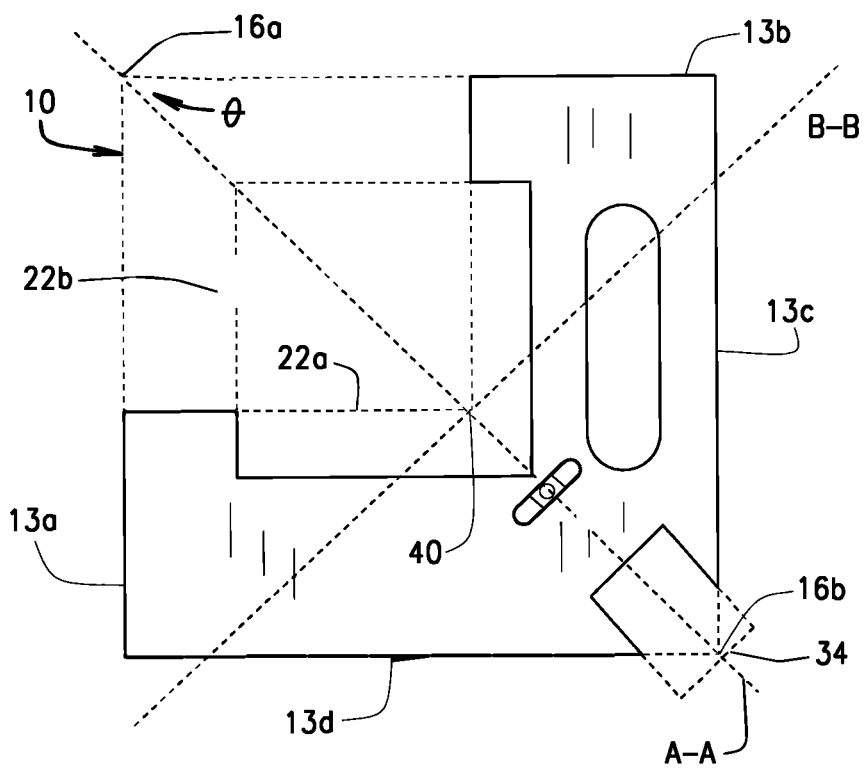

A vinyl siding alignment tool 10 as disclosed herein is configured to verify alignment of vinyl panels around corner posts at the exterior of a building, such as for a residential home. With reference to FIGS. 2a and 2b, in an embodiment, the tool 10 can be constructed out of a thin substantially flat frame 13 in a square-like configuration, typically a panel of wood, but other materials, such as plastics or composites, may be used. First and second corners 16a,b, are removed as first and second cutouts 19a,b, the corners being opposite diagonally from each other. The cutouts are symmetrical about a line A-A that connects the two cutout corners. The shape of the frame 13, with the first cutout 19a, approximates an L-like configuration.

Figure 3:
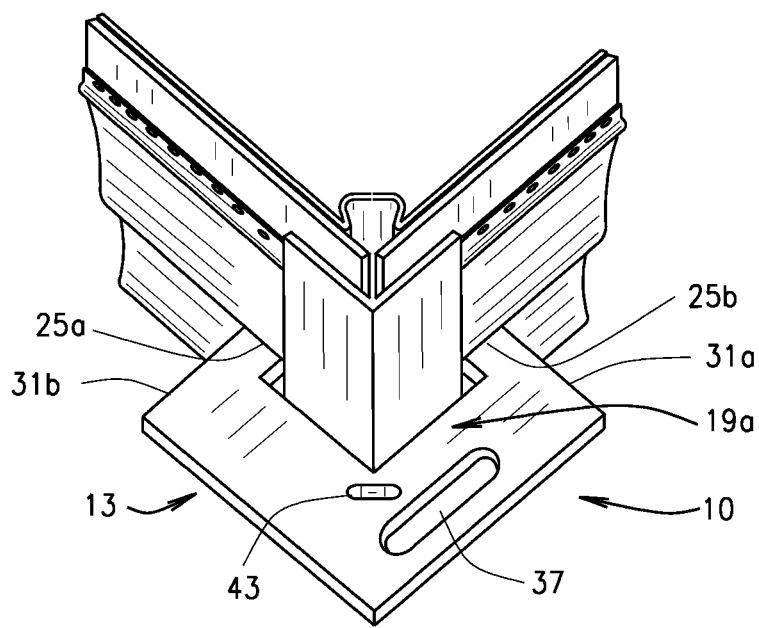
FIG. 3 is a perspective view of the tool in use on an exterior corner.

As shown in FIG. 3, the first cutout 19a is cut to fit around an exterior corner post to verify panel alignment. Referring to FIGS. 2a and 2b, it is generally defined as two distinct overlapping square-like cutout regions 22a,b, the regions being symmetrical about line A-A. The first cutout region 22a is defined at the first corner 16a of the frame 13, extending along adjacent sides 13a,b of the frame 13 to a predefined position, then extending perpendicularly from said adjacent sides 13a,b to meet at line A-A. The second cutout region 22b is defined between the first and second corners 16a,b and is generally the same shape as the first cutout region 22a. The overlapping cutout regions 22a,b define first abutment faces 25a,b and matching notches 28a,b, the abutment faces 25a,b abutting against the vinyl siding around an exterior corner when the tool is in use with the corner post being positioned and received within matching notches 28a,b.

Figure 4A:
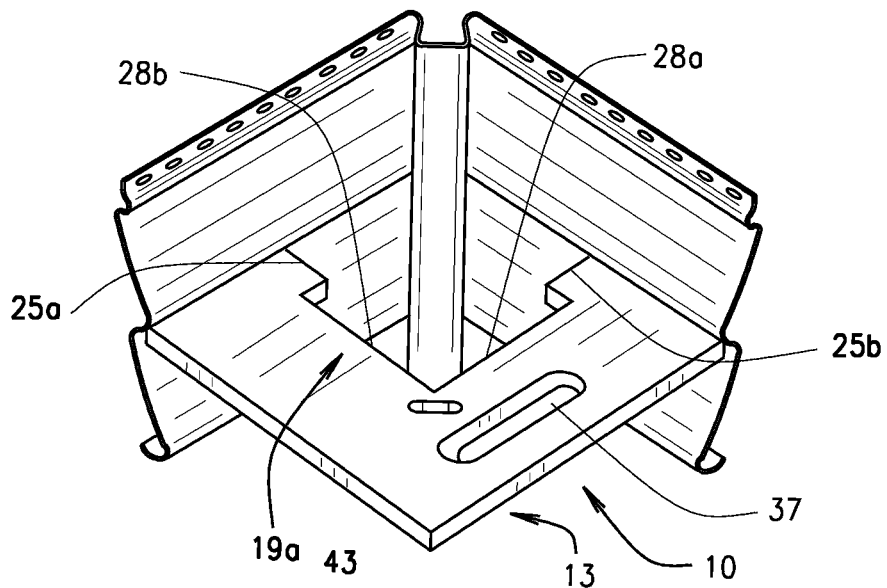
FIG. 4a is a perspective view of the tool in use on a first interior corner.

The adjacent sides 13a,b of the frame 13 define a measurement angle θ, typically 90°, with respect to each other. Second abutment faces 31a,b are positioned on the portion of the adjacent sides 13a,b that have not been removed by the first cutout 19a. As seen in FIG. 4a, the second abutment faces 31a,b are configured to be fit into an interior corner, thereby abutting against the vinyl siding within an interior corner when the tool is in use.

Figure 4B:
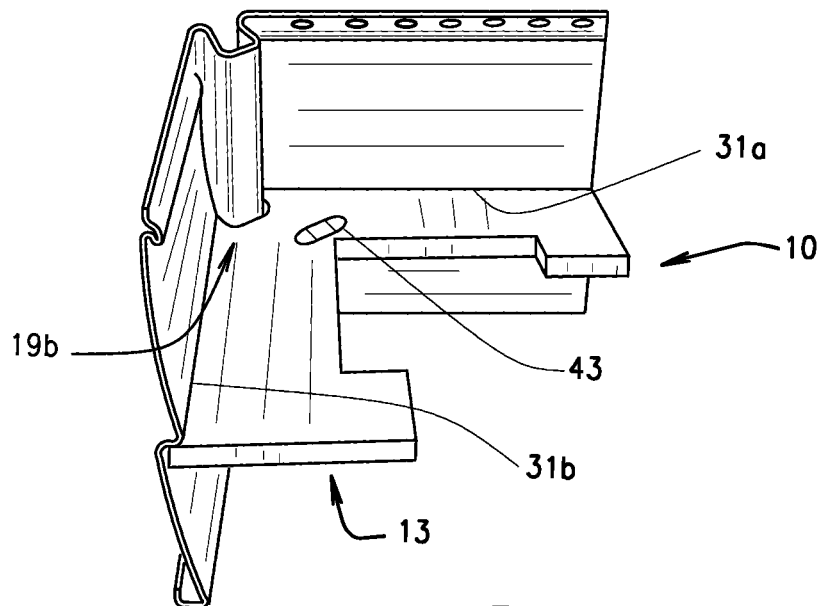
FIG. 4b is a perspective view of the tool in use on a second interior corner.

Referring to FIGS. 2a and 2b, the second cutout 19b in an embodiment of the disclosure can be cut from the second corner 16b diagonally opposite to the first corner 16a. In this embodiment, the cutout 19b is shaped such that line A-A bisects the shorter side of a substantially rectangular shape 13 with the substantially rectangular shape 34 extending along line A-A to encompass the entire of the corner 16b. As seen in FIG. 4b, the second cutout 19b is sized to receive the inner corner post to verify the alignment of vinyl siding at an inner corner. Sides of the tool serve as a second pair of abutment faces 31c,d that are used for verifying the alignment of siding around an inner corner, thereby providing the installer with a second method of verifying inner corner alignment.

In an embodiment of the disclosure, a handle 37 is positioned adjacent to the second cutout 19b along the side 13c of the frame 13 and is defined as an elongated hole that extends along the length of the side 13c. Referring to FIGS. 2a and 2b, it is positioned such that it aligns with the center of gravity 40 of the tool 10 that is positioned along line B-B. The handle 37 is sized such that an installer can position his/her hand within the tool 10 when in use. The second cutout 19b is positioned relative to the handle 37, such that, when in use, the installers hand will be positioned in the handle 37 while his/her thumb may be positioned in the second cutout 19b. In this sense, the second cutout 19b provides a second functional purpose for the installer. This, in combination with alignment between the second cutout 19b and the center of gravity 40 of the tool will make it easier for the installer to stabilize the tool 10 when in use.

A slot 43 is defined within the frame 13 at a position between the cutout corners 16a,b, the slot being substantially shaped as an elongated oval. It is positioned perpendicularly and symmetrically to line A-A. A bubble level 46 is inserted into the slot 43 and is secured in position. The bubble level 46 may be secured by an adhesive or a frictional fit, or any means intended to create a permanent placement. When the tool 10 is in use, the bubble level 46 provides immediate feedback to the installer verifying the alignment of the panels around a corner post.

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

The invention claimed is:

1. A tool for verifying the alignment of the vinyl siding of a building, the tool comprising:
   a frame;
   a pair of adjacent sides of the frame, the adjacent sides defining a first corner with a predetermined angle;
   a first cutout region positioned at said first corner of the frame, the first cutout region comprising two interior abutment faces and two interior notches, wherein the first cutout region is configured to receive an exterior corner post with the interior abutment faces abutting the vinyl siding at a defined exterior angle and the exterior corner post being positioned within the interior notches; wherein the first cutout region is cut between the adjacent sides;
   the adjacent sides further defining two exterior abutment faces, the exterior abutment faces configured to abut an interior angle of installed vinyl siding with an interior corner post received within the space defined by the first cutout region;
   a second cutout region positioned at an opposite diagonal corner from the first cutout region; wherein the second cutout region is configured to receive an interior corner post;
   a slot positioned between said diagonally opposite corners of the frame, a leveling means resting within the slot; wherein the leveling means provides feedback related to the alignment of vinyl siding panels around the interior or exterior corner posts.

2. The tool of claim 1 wherein the tool further comprises a handle positioned along a side of the frame.

3. The tool of claim 1 wherein the leveling means comprises a bubble which is configured to move to a central location within the slot of the tool when the two vinyl siding panels are substantially level.

4. A method to align or to verify alignment of the level of two vinyl siding panels, each panel having a center butt location and a butt location, at a corner of two building walls to which vinyl siding is being applied, wherein the method comprises the steps of obtaining a tool, the tool comprising:
   a frame;
   a pair of adjacent sides of the frame, the adjacent sides defining a first corner with a predetermined angle;
   a first cutout region positioned at said first corner of the frame, the first cutout region comprising two interior abutment faces and two interior notches, wherein the first cutout region is configured to receive an exterior corner post with the interior abutment faces abutting the vinyl siding at a defined exterior angle and the exterior corner post being positioned within the interior notches; wherein the first cutout region is cut between the adjacent sides;

the adjacent sides further defining two exterior abutment faces, the exterior abutment faces configured to abut an interior angle of installed vinyl siding with an interior corner post received within the space defined by the first cutout region;

a second cutout region positioned at an opposite diagonal corner from the first cutout region; wherein the second cutout region is configured to receive an interior corner post;

a slot positioned between said diagonally opposite corners of the frame, a leveling means resting within the slot; wherein the leveling means provides feedback related to the alignment of vinyl siding panels around the interior or exterior corner posts;

placing the tool on an inside or outside corner of a building to which vinyl siding is being installed;

positioning the tool just below and in contact with the center butt or butt of the two siding panels and substantially perpendicular to both walls;

inspecting to see if the leveling means indicates that the vinyl panels are aligned.

5. The method of claim 4 wherein the tool further comprises a handle positioned along a side of the frame.

6. The method of claim 4 wherein when the leveling means indicates that the vinyl siding panels are not substantially level, the method further comprises the step of re-positioning the two vinyl siding panels and re-inspecting the alignment of the two vinyl siding panels to determine whether the two vinyl siding panels have been substantially aligned.

7. The method of claim 4 wherein the first cutout region of the tool is positioned to receive an exterior corner post.

8. The method of claim 4 wherein the first cutout region of the tool is positioned to receive an interior corner post.

9. The method of claim 4 wherein the second cutout region of the tool is positioned to receive an interior corner post.

* * * * *